(12) United States Patent
Wang et al.

(10) Patent No.: US 9,864,595 B2
(45) Date of Patent: Jan. 9, 2018

(54) SOFTWARE UPDATING METHOD, SYSTEM, AND DEVICE

(71) Applicant: CHIGOO INTERACTIVE TECHNOLOGY CO., LTD., Wuxi (CN)

(72) Inventors: Xinheng Wang, Wuxi (CN); Hui Zhang, Wuxi (CN); Xiaohuan Lu, Wuxi (CN)

(73) Assignee: CHIGOO INTERACTIVE TECHNOLOGY CO., LTD., Wuxi Jiangsu Province (CN)

( * ) Notice: Subject to any disclaimer, the term of this patent is extended or adjusted under 35 U.S.C. 154(b) by 18 days.

(21) Appl. No.: 14/911,788

(22) PCT Filed: Aug. 12, 2014

(86) PCT No.: PCT/CN2014/084165
§ 371 (c)(1),
(2) Date: Feb. 12, 2016

(87) PCT Pub. No.: WO2015/021905
PCT Pub. Date: Feb. 19, 2015

(65) Prior Publication Data
US 2016/0196128 A1   Jul. 7, 2016

(30) Foreign Application Priority Data

Aug. 12, 2013   (CN) .......................... 2013 1 0348829

(51) Int. Cl.
*G06F 9/44*   (2006.01)
*G06F 9/445*   (2006.01)
(Continued)

(52) U.S. Cl.
CPC ............ *G06F 8/65* (2013.01); *H04L 12/1877* (2013.01); *H04L 67/34* (2013.01); *H04L 67/42* (2013.01); *H04W 4/001* (2013.01); *H04W 4/06* (2013.01)

(58) Field of Classification Search
None
See application file for complete search history.

(56) References Cited

U.S. PATENT DOCUMENTS 8,074,213 B1 * 12/2011 Holtz ........................ G06F 8/65
717/172
2004/0131025 A1 * 7/2004 Dohler ................. H04B 7/2606
370/328

(Continued)

FOREIGN PATENT DOCUMENTS

| CN | 1584865 A | 2/2005 |
|---|---|---|
| CN | 101795203 A | 8/2010 |
| CN | 102065110 A | 5/2011 |

OTHER PUBLICATIONS

International Search Report for PCT/CN2014/084165, ISA/CN, Beijing, dated Nov. 19, 2014, with English translation.
(Continued)

*Primary Examiner* — Chameli Das
(74) *Attorney, Agent, or Firm* — Stephen T. Olson; Harness, Dickey & Pierce, P.L.C.

(57) ABSTRACT

Disclosed are a method system, and device of updating local software. The method comprises: broadcasting a broadcast message for updating local software to multiple client ends; determining whether a response message about existence of the update software is received, updating local software through the client end sending out the response message, or through a remote server if no response message is received. Accordingly, restriction on transmission speed by OTA server in software update process and congestion in data (Continued)

transmission process can be avoided, thus improving downloading speed and facilitate a simultaneous update of software for a mass of devices.

6 Claims, 6 Drawing Sheets

(51) Int. Cl.
*H04L 29/08* (2006.01)
*H04W 4/00* (2009.01)
*H04W 4/06* (2009.01)
*H04L 12/18* (2006.01)
*H04L 29/06* (2006.01)

(56) References Cited

U.S. PATENT DOCUMENTS

| | | | | |
|---|---|---|---|---|
| 2004/0261071 A1* | 12/2004 | Chuang | ............... | G06F 8/65 717/170 |
| 2005/0105524 A1* | 5/2005 | Stevens | ............... | H04L 45/04 370/389 |
| 2005/0228798 A1* | 10/2005 | Shepard | ............... | H04L 67/34 |
| 2006/0224670 A1 | 10/2006 | Kubota | | |
| 2007/0174471 A1 | 7/2007 | Van Rossum | | |
| 2008/0268844 A1* | 10/2008 | Ma | ............... | H04W 36/0033 455/436 |
| 2008/0287058 A1 | 11/2008 | Nahm et al. | | |
| 2010/0070963 A1 | 3/2010 | Bae et al. | | |
| 2010/0290627 A1* | 11/2010 | Tsuji | ............... | H04L 9/0825 380/282 |
| 2010/0322128 A1* | 12/2010 | Becker | ............... | H04W 4/08 370/312 |
| 2011/0213681 A1* | 9/2011 | Shahid | ............... | G06Q 30/02 705/27.1 |
| 2011/0239209 A1* | 9/2011 | Kotani | ............... | G06F 8/65 717/171 |
| 2011/0289495 A1* | 11/2011 | Mulligan | ............... | G06F 8/61 717/168 |
| 2012/0082147 A1* | 4/2012 | Liu | ............... | H04L 5/001 370/338 |
| 2013/0097595 A1* | 4/2013 | Stern | ............... | G06F 8/68 717/171 |
| 2014/0068648 A1* | 3/2014 | Green | ............... | H04N 21/4394 725/18 |
| 2015/0117420 A1* | 4/2015 | Raman | ............... | H04L 61/103 370/338 |
| 2015/0248287 A1* | 9/2015 | Kotani | ............... | G06F 8/65 717/172 |

OTHER PUBLICATIONS

Written Opinion of the ISA for PCT/CN2014/084165, ISA/CN, Beijing, dated Nov. 19, 2014.
Extended European Search Report regarding EP 14836738.6, dated Feb. 2, 2017.
Office Action in counterpart KR Application No. 1020167006409.

* cited by examiner

SOFTWARE UPDATING METHOD, SYSTEM, AND DEVICE

CROSS-REFERENCE TO RELATED APPLICATIONS

This application is a 371 U.S. National Stage of International Application No. PCT/CN2014/084165, filed Aug. 12, 2014, which claims the benefit of and priority to Chinese Patent Application No. 201310348829.6, filed Aug. 12, 2013. The disclosures of the above applications are incorporated herein by reference.

FIELD OF THE INVENTION

The invention relates to data transmission technology, and more particularly, to a method of updating software and a system and device for carrying out the method.

BACKGROUND OF THE INVENTION

With the development of electronic and communication technologies, more and more electronic equipments have been applied to daily life. At present, update of hardware is not compatible with update of software, which causes inconvenience to users. In order to solve this problem, there have been provided a reconfigurable device. In such reconfigurable device, however, improvement of the hardware must be supported by software. Hardware supporting reconfigurable devices comprises FPGA or rDPA processor which can be programmed to regulate their functions.

Software refactoring is an effective way to realize various functions of hardware. A common way is putting the developed software on a server so that reconfigurable devices can update their software by downloading the developed software over wired or wireless networks from the server. Because of the widespread use of smart phones, downloading through OTA (Over-The-Air) has become a main way. A working group called Mobile Alliance Open (OMA) is formed by several major institutions in the world to develop technical standards for OTA owing to many benefits of OTA. The standards of OMA DM (Device Management) set by OMA have been adopted by IBM, Microsoft as well as other large manufacturers. According to statistics on recently released movable devices, 80% of the firmware can be reconstructed. DM OMA can be used not only to download and update the software, and correct the bugs in the software, but also for vehicle management, monitoring equipment signal and quality control. In recent years, people have also done a lot of works to improve the performance of DM OMA, such as designing new management agent, etc. However, all these methods are based on the traditional client/server mode which is not fit for the situation in which a large number of devices download and update concurrently.

Domestic patents related to OTA mainly focus on four aspects, namely, the new method of OTA technology, the new method of OTA realization, the application of OTA and the test concerning OTA.

A method of downloading a firmware disclosed in Chinese Patent Publication No. CN101247416, in this patent document, a pretreatment method of downloading a firmware, a method of verifying integrity of a firmware and a method of downloading a firmware were disclosed. However, the methods are still based on the traditional client/server mode.

A terminal with multiple processors and a method of downloading through OTA thereof are disclosed in Chinese Patent Publication No. CN102625288A. The terminal with multiple processors comprises an AP (Application Processor), a CO (Communication Processor) and a UICC (Universal integrated circuit card). The AP acts as a relay station of the UICC and the OTA server. When the UICC sends a request for downloading data to the OTA server, the request is first sent to the AP, and then to the OTA server from the AP. The AP receives a response data which is send by the OTA server in response to the request for downloading data and sends the response data to the UICC for downloading. This invention has improved the speed of downloading by means of data exchange between the OTA server and the UICC via the AP. This technical solution breaks through the traditional client/server mode and improves the efficiency of downloading through OTA. However, these methods of downloading through OTA disclosed in the published patent documents and published research papers are still of downloading software directly or indirectly from the OTA server. Hence, a demand on the performance of the OTA server and high data transfer speed will directly affect the client's use of OTA. In the case that there are a great number of users and the large data capacity to be processed, such technique cannot satisfy users' needs.

SUMMARY OF THE INVENTION

In the aforementioned prior art, since the existing methods of updating data and software are all implemented with data exchange through the OTA server, it is difficult to meet various needs of customer's service terminal in case of large number of service terminals, large data capacity of transmission data and intensive client requests. Meanwhile, waste of data transmission resources exists and cost increases due to a large amount of the same data being sent in the network.

Therefore, one object of the invention is to solve the problems of limitation of transmission speed by the OTA server in the software update process and congestion in data transmission.

In accordance with one aspect of the present invention, a method of updating software is provided, said method comprising the steps of:
  broadcasting a broadcast message comprising information for updating local software to multiple client ends;
  determining whether a client end sends out a response message comprising information of existence of updated software, and updating local software of other client ends through the client end which sends the response message; or updating local software through a remote server if no client end makes response.

In some embodiments, the client end may comprise a DL Agent module and a CIC (Central Information Controller) module. The DL Agent module sends a request to the CIC module when a client end requests to update its local software. The CIC module is configured to send a broadcast message including information about local update software, register and manage the information of a client end which sends out a response message and determine a manner of downloading the update software. Then the DL Agent module connects with the client end or server to download the update software and install the update software according to the manner of downloading determined by the CIC module.

In accordance with another aspect of the present invention, a system of updating software includes a broadcast sending unit configured to send out a broadcast message including information about local update software to multiple client ends, and an updating unit configured to determine whether a client end sends out a response message including information on existence of update software, and to update local software through the client end sending out the response message, or update local software through a remote server if no response is received.

In accordance with yet a further aspect of the present invention, a device of updating software includes a sending module and an Updating module. Wherein said sending module is configured to send out a broadcast message including information about local update software to multiple client ends, and said Updating module is configured to determine whether a response to the existence of the update software is received, and to update local software through the client end sending out the response message, or update local software through a remote server if no response message is received.

The embodiments of the invention have the following advantages: client ends in a certain area can ascertain information of the stored software through communication. If a certain client end stores the software needed by other client ends, the software can be downloaded from the client end stored the software. Otherwise the software will be downloaded from an OTA server. Such a decentralized downloading mode will make it possible for a device to download not only from a server but also from an adjacent node, thus improving the downloading speed, which facilitates simultaneous software updating for a mass of devices, and avoids the possibility of congestion or paralysis caused by a simultaneous requests from a large number of devices.

Those skilled in the art will understand that, although the method of this invention described above takes software update as an object, it can also be used to download and install new software in the local end. As such, the meaning of wording "software update" in this application not only refers to "updating old software" but also refers to "downloading new software".

BRIEF DESCRIPTION OF THE DRAWINGS

Embodiments of the present information will now be described with reference to the accompanying drawings. These drawings are intended to describe certain specific embodiments of the invention in order to facilitate understanding of idea and the spirit as well as scope of the invention but not to limit the present invention, and wherein.

DETAILED DESCRIPTION

The present invention will be further described in detail by referring to some embodiments in conjunction with the accompanying drawings as follows.

Figure 1:
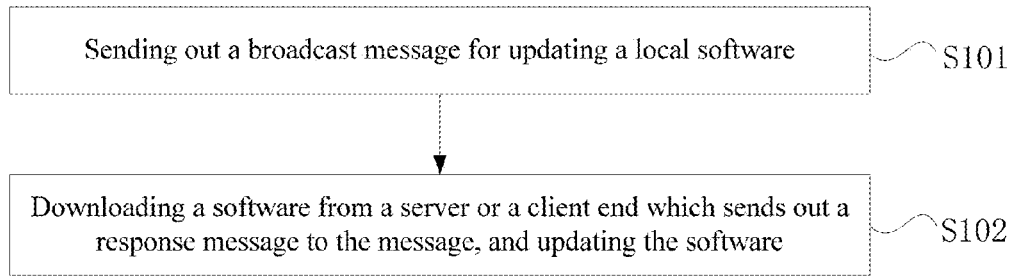
FIG. 1 is a flow chart illustrating a method of updating software according to an embodiment of the invention.

FIG. 1 is a flow chart illustrating a method of updating software according to an embodiment of the present invention, in which the method comprises the following steps:

Step S101: sending out a broadcast message about software to be updated. In this step, a CIC module of a client end sends out a broadcast message about software needs to be updated to its neighboring multiple client ends. The broadcast message generally comprises name and version of the software and other related information.

Step S102: updating local software. The neighboring client end will make an immediate response when its CIC module receives the broadcast message. The client end which sends out the broadcast message then locates a client end device which stores the software from the response messages, registers the device ID of the located device to obtain total software information from the device, and communicates with the located device using the device ID. A request of software downloading is then sent to the located device so as to download the software directly after the located device confirms the request. If the received response message does not contain the software that is needed to be updated, then the client end that sends out the broadcast message will directly communicate the OTA server to download update software from the server in a conventional way.

In an embodiment, in step S102, the step of updating local software through a client end from which a response message is sent comprises: registering address of the client end which sends out the response message in a software reading list of the local client end, and updating local software according to the software reading list of the local client end.

In an embodiment, the step of updating local software through a client end which sends a response message further comprises determining whether there are more than one client ends that make response. If so, an idle responding client end can be determined according to the level of busy of these client ends, and updating of local software will be done through the determined idle responding client end. On the other hand, if there is only one client end that makes response, then updating of local software is done through this responding client end.

The step of determining an idle responding client end according to the level of busy of multiple client ends may comprise: obtaining a maximum data exchange rate among these multiple responding client ends by measuring the data traffic and the capacity of the node, and determining the responding client end corresponding to the maximum data exchange rate as an idle responding client end. Thus, a client end for downloading can be determined according to the level of busy of the responding client end when there are multiple responding client ends having update software, thereby optimizing the load balance among client ends.

Figure 2:
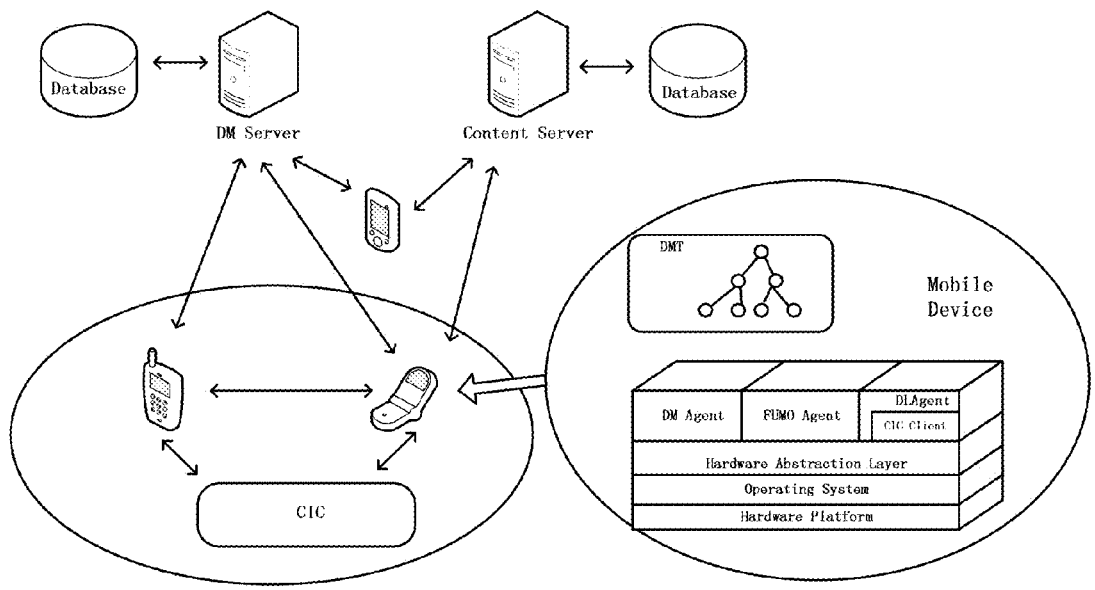
FIG. 2 is a schematic diagram of decentralized download according to an embodiment of the invention.

In this embodiment, two downloading modes, namely, the traditional client end/server mode and the proposed distribution mode are combined. A method of downloading in this embodiment is shown in FIG. 2. A new module named DL agent is provided in client end device. A DL agent module, a DM agent module and a FUMO (Update Management Object Firmware) agent module can coexist in one client end device. A downloading mode can be selected intelligently according to the actual situation.

A CIC (Central Information Controller) module is provided in the DM agent module. And the CIC module can communicate with other CIC module which is provided by other client end device to carry out downloading of software among client end devices. The CIC module records the software information in the device, releases information to other client end devices and manages software downloading.

When a client end device requests to update its local software, it will firstly send a request in the form of a broadcast message to the CIC module of other devices in its local area network. If the needed software exists in the CIC module of a device, then the device which sends the request will communicate with the device having the needed software and download the software from the latter. If the needed software does not exist in any devices of the local area network, the device requesting updating of software will then establish a connection with a server and download the software from the server. Software downloading from either a client end or from a server is conventional and hence detailed description thereof is omitted.

If a device leaves a certain area (for example, the leaving is judged according to a disconnection of a wireless connection with the device), the information provided by the device will be removed from the CIC module of other devices in this area.

Figure 3:
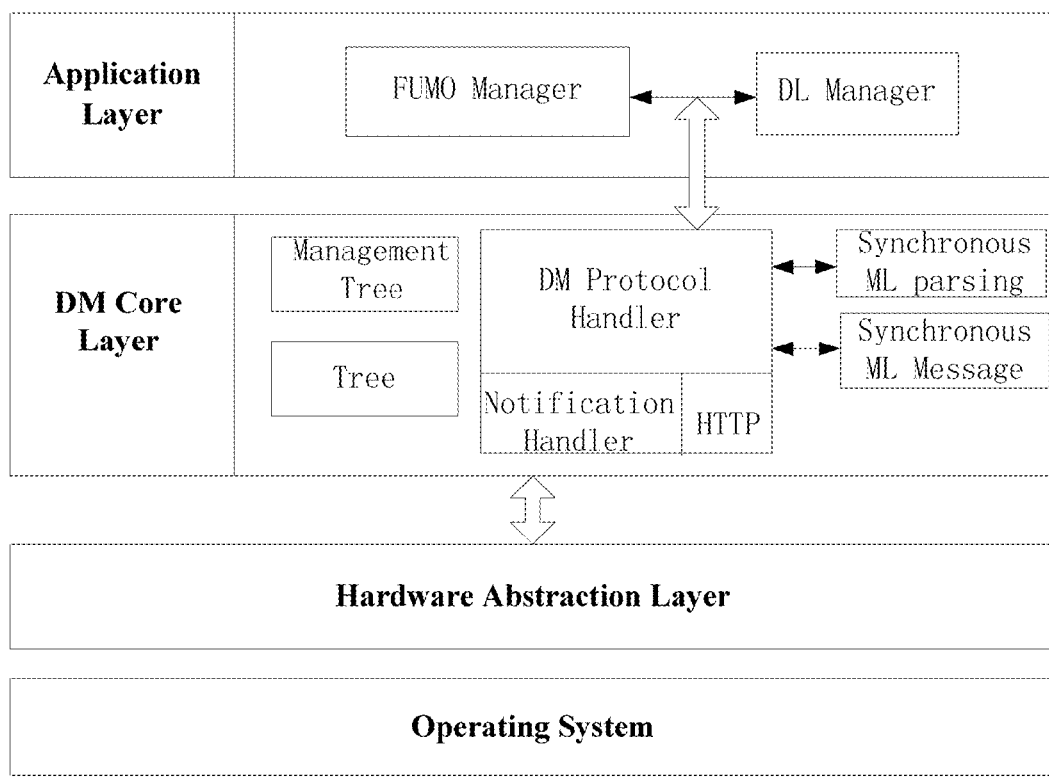
FIG. 3 is a schematic diagram of programming level of an agent in a client end device according to an embodiment of the invention.

The implementation of the agent in client end device will be described below. From the programming point of view, the logic design in the client end is divided into four levels. As shown in FIG. 3, the four levels comprise, from top to bottom, an application layer, a DM core layer, a hardware abstraction layer and an operating system.

The main parts of the invention are realized in the application layer and the DM core layer, and will be described as follows. Hardware and operating system adopts conventional structure. Taking a mobile phone for an example, mobile phone hardware and operating system such as Android and IOS, etc, provide an operating environment for applications software running therein. Although the developed software may be different under each system, this difference has no effect on the method itself. That is to say, those skilled in the art can use conventional means to implement the method of the present invention described above on different corresponding hardware and operating system. Therefore, the hardware abstraction layer and the operating system are not described in this specification.

The application layer conducts management operation during software updating. The application layer receives operation instructions from the DM core layer and achieves management operations specified by the instructions, such as software downloading and updating, etc. In addition, it also sends back the results of operations to the DM core layer for further processing. Then, the result can be sent back to the server. Both FUMO agent and DL agent are deployed in the application layer.

Wherein the FUMO agent is a core module for downloading and updating OMA DM firmware, which is an inherent module of standardization. FUMO agent is mainly composed of two packages, namely dm.client.downloadmanager and dm.client.updatemanager.

Figure 4:
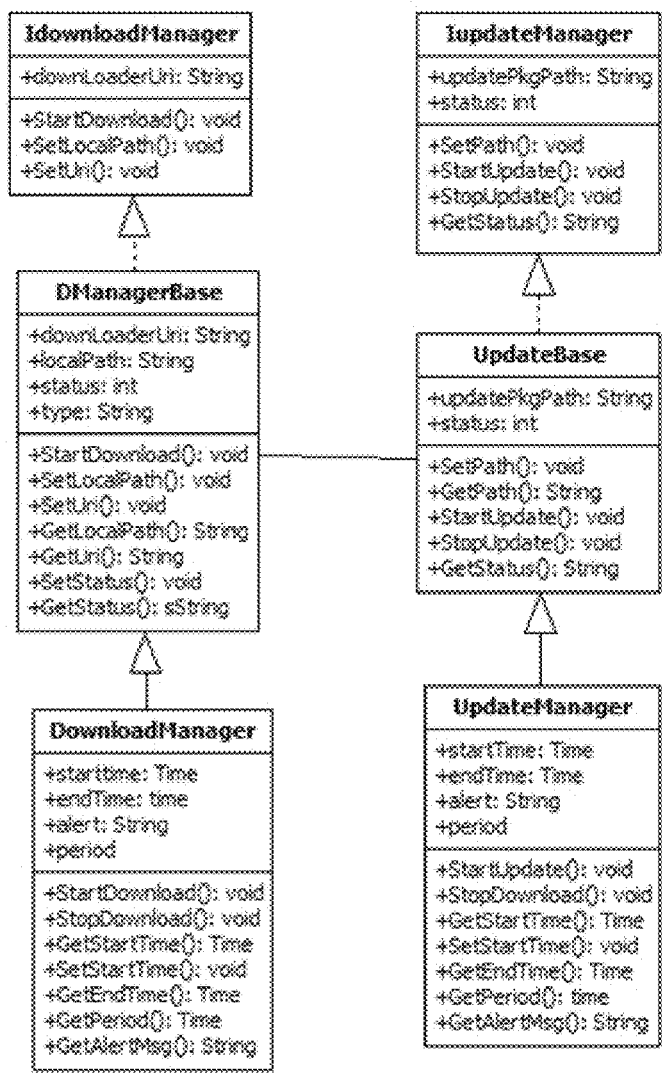
FIG. 4 is a schematic diagram of FUMO agent module according to an embodiment of the invention.

The package of dm.client.downloadmanager is responsible for the processing of software update parsed by the DM core layer and collaborating with the DL agent to manage the software downloading. It is also responsible for downloading software when using a traditional client/server downloading mode. The package of dm.client.updatemanager is mainly responsible for software update. FIG. 4 illustrates the detailed design of the two packages, both of which are conventional designs and hence a detailed description thereof is omitted.

The DL agent is a software download mechanism which is provided by the present invention. It can cooperate with the FUMO agent to achieve software downloading in various circumstances. The DL agent here plays a role of administrator which is responsible for coordinating and scheduling of various modules including download management module of the system. It determines which method to be used for downloading software based on the information in the CIC module. Therefore, the DL agent has the ability to communicate with CIC module so as to obtain relevant software information. Moreover, it can also download the software from a neighboring client end. The DL agent is implemented by a package called dm.client.dlagent. The package of dm.client.dlagent consists of five classes that represent different functions.

DlManager class is the main part of the DL agent module which is responsible for managing operations of other classes and notifying the FUMO agent which method is used for downloading.

RspforSwRQ class is used to obtain information from the CIC module.

DlMethodDecider class is used to determine the downloading mode according to the information obtained from the CIC module.

Communication class is responsible for implementing communication between the DL agents and other devices.

DecentralizedDownloader class is responsible for downloading software when using decentralized downloading (downloading from other client ends) mode.

Figure 5:
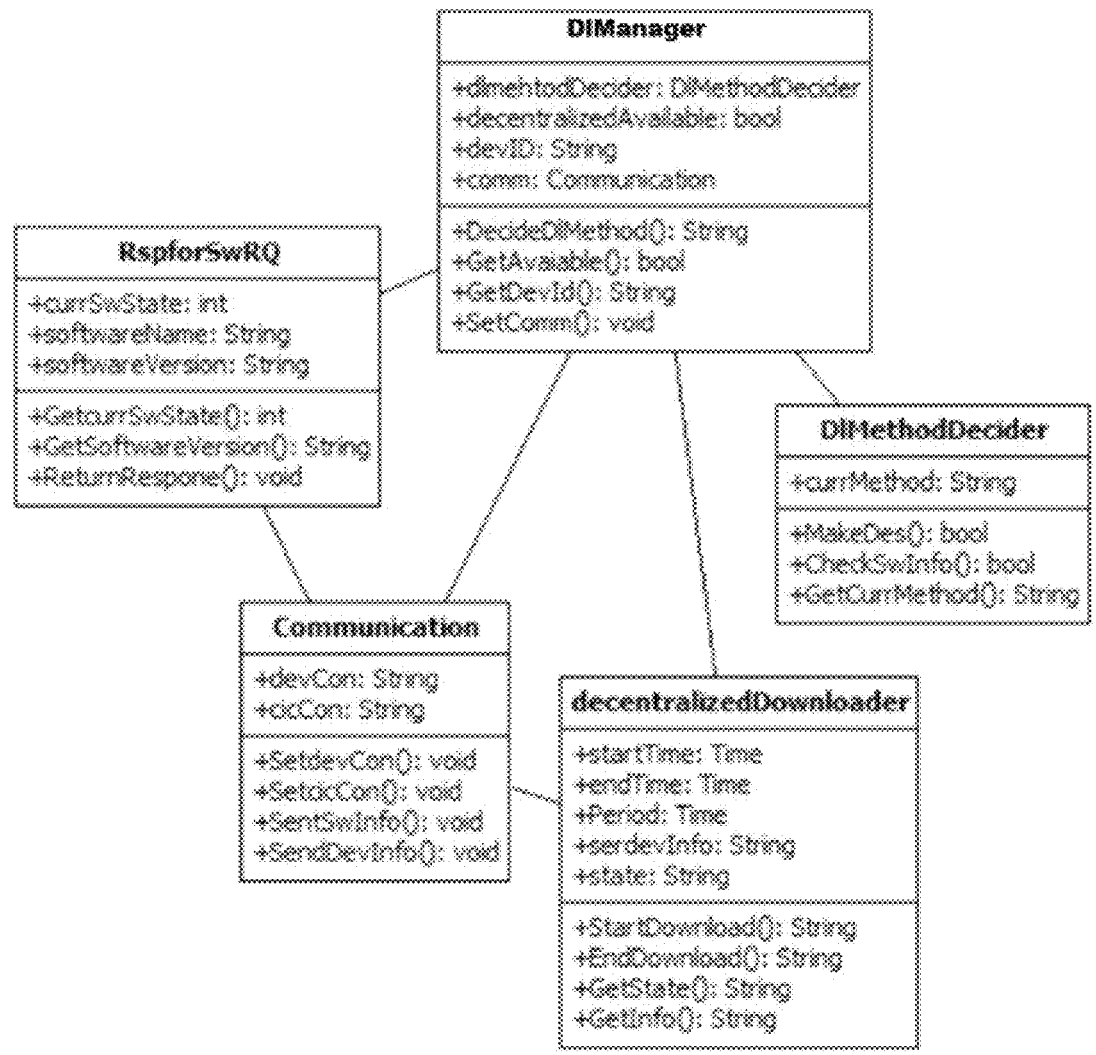
FIG. 5 is a schematic diagram of DL Agent module design according to an embodiment of the invention.
Figure 6:
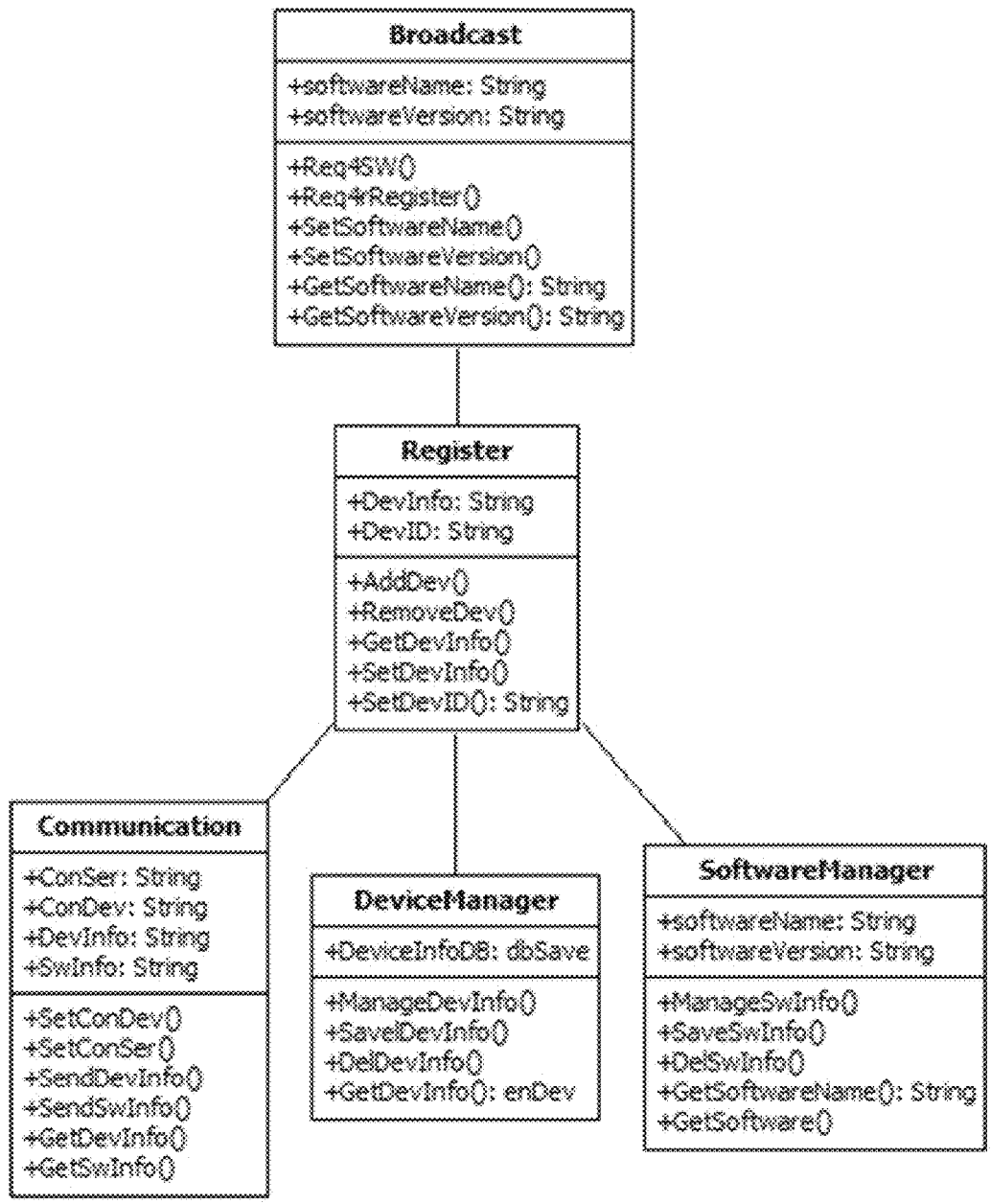
FIG. 6 is a schematic diagram of CIC module design according to an embodiment of the invention.

Detail of each class is shown in FIG. 5. The CIC module is the control center which is used to decide a downloading manner. In view of code writing, the CIC module consists of five classes for achieving five different functions, namely Broadcast, Register, DeviceManager, SoftwareManager and Communication. FIG. 6 schematically shows these classes.

The Broadcast class is configured to broadcast the request for software updating to its adjacent client end devices using Req4SW. If an adjacent client end device has this software, it will return equipment and software information to the CIC module using the function of Req4Register. The CIC module will then register the device using the AddDev function of the Register class. After registration is completed, the CIC module will manage specific devices and software using DeviceManager class and SoftwareManager class. The management, for example, software management, may include registering, canceling a software information, getting a software name and obtaining a software, etc.

When a client end device requests to update its software, a request will be send to the CIC module using the Communication module. If the CIC module finds the software associated with the update information (such as name and version number) in the Register class in response to the request, it will notify the device which sends out the request. Then a direct connection is established between the device sending out the request and the device having the update software. If the CIC module does not find the software associated with the update information, the device sending out the request will communicate with a content server, download and update software through the FUMO agent using traditional downloading mode of OMA DM.

Figure 7:
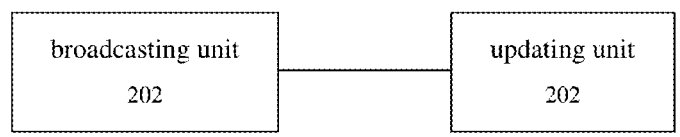
FIG. 7 is a block diagram illustrating a system of updating software according to an embodiment of the invention.

FIG. 7 is a block diagram illustrating a system for software updating according to an embodiment of the invention. The system comprises a broadcasting unit 201 and an updating unit 202. Broadcasting unit 201 is configured to send a broadcast message including information on local update software to other client ends, and the updating unit 202 is configured to determine whether a response regarding the existence of the update software is received, and update the local software through the client end making the response message, or through a remote server if no response is received.

Meanwhile, the updating unit 202 is further configured to register the responding client end's address in a software reading list of the local client end and update local software by the local client end software reading list.

When more responding client ends exist, the updating unit 202 determines whether there are more than one responding client ends. If so, the updating unit 202 determines an idle responding client end according to the level of busy of the multiple responding client ends, and updates local software through the determined idle responding client end. If only one responding client end exists, then the updating unit 202 updates local software through this responding client end. Moreover, by obtaining a maximum data exchange rate among multiple responding client ends, a responding client end with the maximum data exchange rate can be determined as an idle responding client end.

Figure 8:
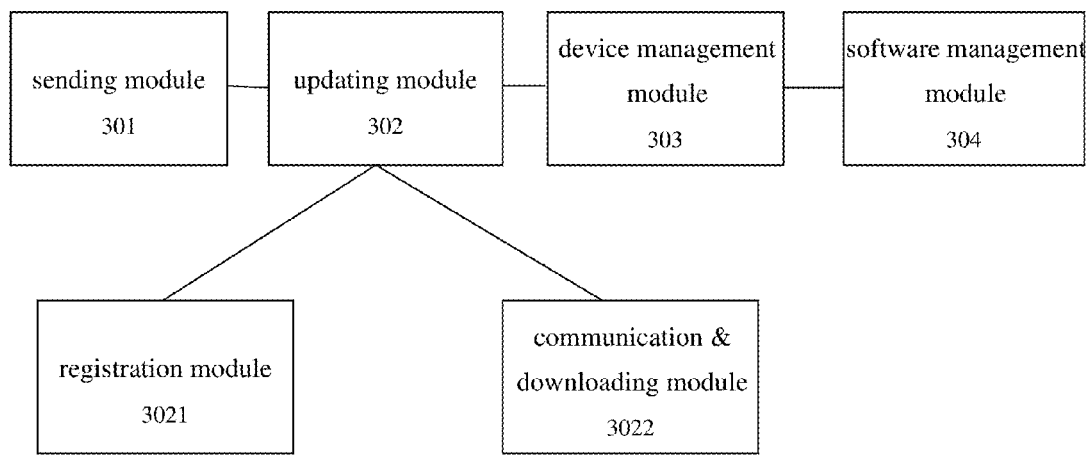
FIG. 8 is a block diagram illustrating a device for updating local software according to an embodiment of the invention.

FIG. 8 is a block diagram illustrating a device for software updating according to an embodiment of the invention. The device may comprise a sending module 301 and an Updating module 302, and wherein:

Sending module 301 is configured to send a broadcast message including information of local update software to other client ends;

Updating module 302 is configured to determine whether a response regarding the existence of the update software is received, and if so, updating the local software through the client end sending the response message; if not, updating local software through a remote server.

Updating module 302 may further comprise a registration module 3021 for registering the address of the responding client end in a software reading list stored in the local client end, and a communication & download module 3022 for updating local software according to the software reading list.

The device may further comprise a device management module 303 configured to generate device information of responding client end, and a software management module 304 configured to generate name, version and capacity information of updated software.

The device may operate according to the methods described above, and therefore description thereof will not be repeated.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

The invention claimed is:

1. A method of updating software, applied in a device, comprising:
  broadcasting a broadcast message for updating local software to other multiple client ends;
  determining whether a client end sends out a response message comprising information of existence of updated software, and updating local software through the client end which sends out the response message, and updating local software through a remote server if no client end makes response,
    wherein updating local software through the client end which sends out the response message comprising:
  determining whether more than one of said responding client end exist, and determining an idle responding client end according to a level of busy of the more than one responding client ends to update local software through the determined idle responding client end, and updating local software through the only client end which sends out the response message,
  wherein said determining an idle responding client end according to a level of busy of the more than one responding client ends includes obtaining a maximum data exchange rate among said responding client ends, and determining a responding client end with the maximum data exchange rate as the idle responding client end.

2. The method of claim 1, wherein said updating local software through the client end which sends out a response message further comprises:
  registering address information of the client end which sends out the response message in a software reading list of a local client end;
  updating the local software according to the software reading list.

3. The method of claim 1, wherein the client end comprises a Download (DL) Agent module and a Central Information Controller (CIC) module, and said method further comprises:
  the DL Agent module sending a request to a CIC module when the client end requests to update local software;
  the CIC module sending a broadcast message for updating local software, registering and managing the information of a client end which sends out a response message, and determining a way of downloading the update software; and
  the DL Agent connecting with a corresponding client end or a server to download the update software and install the update software according to the way of downloading determined by the CIC module.

4. A device for updating software, comprising:
  at least one processor; and
  a memory communicably connected with the at least one processor for storing instructions executable by the at least one processor, wherein execution of the instructions by the at least one processor causes the at least one processor to perform the operations of:
  sending, by a Download (DL) agent encoded on the device, a broadcast message for updating local update software to other client ends, and
  determining, by the DL agent encoded on the device, whether a client end sends out a response message on existence of the update software, and updating, by an Updated Management Object Firmware (FUMO) agent encoded on the device, local software through the client end which sends out the response message or through a remote server if no response is received,
    wherein updating, by FUMO agent encoded on the device, local software through the client end which sends out the response message comprising:
  determining whether more than one of said responding client end exist;
  determining an idle responding client end according to a level of busy of the more than one responding client ends to update local software through the determined idle responding client end, and updating local software through the only client end which sends out the response message,
  wherein said determining an idle responding client end according to a level of busy of the more than one responding client ends includes obtaining a maximum data exchange rate among said responding client ends, and determining a responding client end with the maximum data exchange rate as the idle responding client end.

5. The device of claim 4, wherein execution of the instructions by the at least one processor further causes the at least one processor to perform the operations of:
   registering the responding client end's address in a software reading list of the local client end, and
   updating local software according to the software reading list.

6. The device of claim 4, wherein execution of the instructions by the at least one processor further causes the at least one processor to perform the operations of:
   generating device information of said responding client end, and
   generating name, version and capacity information of the update software.

\* \* \* \* \*